United States Patent Office 3,349,119
Patented Oct. 24, 1967

3,349,119
OXIDATIVE CARBONYLATION OF OLEFINS IN THE PRESENCE OF INORGANIC ACID ANHYDRIDES
Donald M. Fenton, Anaheim, and Kenneth L. Olivier, Placentia, Calif., assignors to Union Oil Company of California, Los Angeles, Calif., a corporation of California
No Drawing. Filed Feb. 19, 1965, Ser. No. 434,092
12 Claims. (Cl. 260—497)

This invention relates to the oxidative carbonylation of olefins to carboxylic acids, and in particular, relates to oxidative carbonylation of olefins to unsaturated carboxylic acids in a reaction medium containing an inorganic acid anhydride.

U.S. patent application, Ser. 371,751, filed June 1, 1964, discloses a method for the preparation of alpha,beta-unsaturated carboxylic and beta-acyloxycarboxylic acids by an oxidative carbonylation reaction. The disclosed process comprises contacting an olefin, carbon monoxide and oxygen in an organic solvent containing a platinum group metal and, optionally, a redox agent. Spurious side reactions such as oxidation of the organic materials to carbon dioxide can result in the formation of water during the reaction. Accordingly, the reaction medium of the aforedescribed process is maintained substantially anhydrous and preferably entirely anhydrous by the addition of an organic dehydrating agent thereto. While such organic agents have proven to be effective dehydrators, they are expensive and react with water to form reaction products which are often difficult to separate from the reaction medium. Further, such organic dehydrating agents cannot easily be regenerated for reuse.

It is an object of this invention to provide a method for the oxidation of olefins to carboxylic acids in the presence of inorganic acid anhydrides.

It is an additional object of this invention to provide a method for the continuous oxidation of olefins to carboxylic acids in the presence of inorganic acid anhydrides that can be regenerated for continued use in the reaction.

Other and related objects will be apparent from the following description.

We have now found that unsaturated carboxylic acids can be prepared by contacting an olefin, carbon monoxide and oxygen with an organic solvent containing a catalyst comprising a platinum group metal, and optionally, a redox agent, and an inorganic acid anhydride that is nonreactive with the organic reactants and products and the catalyst and insoluble in the reaction medium at the reaction conditions. When the reaction is performed in a nonreactive organic solvent, the alpha,beta-unsaturated carboxylic acids can be obtained directly. When the organic solvent comprises an aliphatic or aromatic carboxylic acid, beta-acyloxycarboxylic acids are also obtained. These products, which comprise carboxylic acid esters of beta-hydroxycarboxylic acids can readily be pyrolyzed by thermal and/or catalytic processing to provide complete conversion to the alpha beta-unsaturated carboxylic acids.

During the oxidative reaction, the platinum group metal is reduced from a higher valency state to a lower valency. The reduced metal is then oxidized to the higher valency by contacting it with oxygen. Preferably, a suitable redox agent is employed to facilitate the oxidation. The overall reaction is as follows:

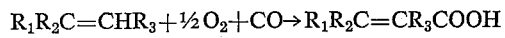

wherein the olefin is as hereinafter described and the catalyst employed is a platinum group metal with, optionally, quantities of a redox agent. The reaction is performed under liquid phase conditions with a solvent comprising an organic solvent of the type hereinafter described. The reaction can be performed under relatively mild conditions and exhibits an attractive rate at reaction conditions comprising temperatures from about 30° to about 300° C. and sufficient pressures to maintain liquid phase conditions, preferably from about atmospheric to about 200 atmospheres or more, the higher pressures being favored to accelerate the reaction.

Water is eliminated from the system, in accordance with our present invention, during the reaction by the addition of an inorganic acid anhydride to the reaction zone. Substantial quantities of the anhydride in the solvent are not necessary because water is not formed in the desired oxidative carboxylation reaction, but rather is generated only by undesired and minor side reactions. Accordingly, we maintain anhydrous conditions by the use of from about 0.1 to about 50, preferably from 2 to about 20, and most preferably from 5 to about 15 weight percent of an inorganic acid anhydride in the reaction medium. In general any inorganic acid anhydride that is nonreactive to the organic reactants, products and catalyst, i.e., the platinum group metal and the redox agent, and insoluble in the reaction medium, can be used. Examples of suitable inorganic acid anhydrides are: antimonic, antimonous, boric, molybdic, permolybdic, phosphatomolybdic, phosphotungstic, silicic, silicotungstic, titanic, tungstic, uranic, etc.

The olefin oxidized in accordance with the invention can, in general, comprise any olefinic compound having from about 2 to about 25 carbons. The olefin should have at least one hydrogen bonded to at least one of the olefinic carbons and thus should be one of the following:

(1) Ethylene and substituted ethylenes such as

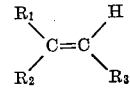

wherein $R_1$, $R_2$ and $R_3$ are hydrogen, alkyl, cycloalkyl, aryl, alkaryl, aralkyl, alkenylalkyl, alkenylaryl, halo, haloalkyl, haloaryl, carboxyl, carboxylalkyl, carboxylaryl, acycloxy or nitroaryl;

(2) Cycloalkenes and substituted cycloalkenes such as

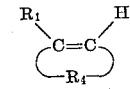

wherein $R_1$ is as previously mentioned and $R_4$ is an alkylene group or isoalkylene group having from 2 to about 6 carbons; or (3) Alkylene cycloalkenes such as

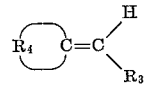

wherein $R_3$ and $R_4$ are as previously mentioned.

Examples of useful olefins are the aliphatic hydrocarbon olefins such as ethylene, propylene, butene-1, butene-2, pentene-2, 2-methylbutene-1, hexene-1, octene-3, 2 - propylhexene-1, decene-2, 4,4' - dimethylnonene-1, dodecene-1, 6-propyldecene-1, tetradecene-5, 2-amyldecene-3, hexadecene-1, 4-ethyltridecene-2, octadecene-1, 5,5 - dipropyldodecene-3, eicosene-7, etc. Of these the aliphatic hydrocarbon olefins having from 2 to about 6 carbons are preferred.

Other olefins include: vinylcyclohexane, allylcyclohexane, styrene, p-methylstyrene, p-vinylcumene, vinylnaphthalene, 1,2 - diphenylethylene, 6 - phenylhexene-1, 1,3 - diphenylbutene-1, 3 - benzylheptene-3, o-vinyl-p-xylene, p-chlorostyrene, m-nitrostyrene, divinylbenzene, 1,5 - heptadiene, 2,5 - decadiene, vinyl chloride, vinylidene dichloride, vinyl fluoride, trichloroethylene, trifluoroethylene, 1,1- bis-chloromethyl ethylene, propenyl chloride, p-vinylbenzoic acid, p-allylphenyl acetic acid, vinyl acetate, vinyl propionate, propenyl acetate, butenyl caproate, ethylidene diacetate, etc.

Cycloalkenes, their substituted derivatives and alkylene cycloalkenes include: cyclobutene, cyclopentene, cyclohexene, methylcyclohexene, amylcyclopentene, cycloheptene, cyclooctene, cyclodecene, methylenecyclohexane, ethylidene cyclohexane, propylidene cyclohexene, etc.

As previously mentioned, the reaction is performed under liquid phase conditions in the presence of a liquid organic solvent which has a solvency for the catalyst and which, preferably, is inert to the reaction conditions. Various organic liquids can be employed for this purpose such as sulfones, amides, ketones, ethers and esters. Also, carboxylic acids such as the lower molecular weight fatty acids or benzene carboxylic acids can also be employed as a solvent.

Illustrative of this last class of solvents are acetic, propionic, butyric, pentanoic, hexanoic, heptanoic, octanoic acids, benzoic, toluic, phthalic acids, etc. Of these, the fatty carboxylic acids having from about 2 to about 8 carbons are preferred. The carboxylic acids are not entirely inert under the oxidation conditions in that the carboxylic acids add to the olefin double bond to form beta-acyloxy compounds. These materials, however, can be readily pyrolyzed to recover both the carboxylic acid for reuse as a reaction medium and the desired unsaturated acid.

Other organic solvents that can be employed include the alkyl and the aryl sulfones such as di-isopropylsulfone, butylamylsulfone, methylbenzylsulfone, etc.

Another class of organic solvents that have sufficient solvency for the catalyst salts and that are inert to the oxidative carboxylation are various amides such as formamide, N,N - dimethylformamide, N,N - ethylisopropylformamide, acetamide, N - phenylacetamide, N,N - dipropylacetamide, iso-butyramide, N-ethylisobutyramide, isovaleramide, N,N - dimethylisovaleramide, isocaprylamide, N,N-methyl-n-caprylamide, N-propyl-n-heptanoyl amide, iso-undecylamide, etc.

Various alkyl and aryl ketones can also be employed as a reaction solvent, e.g., acetone, methyl ethyl ketone, diethyl ketone, di-isopropyl ketone, ethyl n-butyl ketone, methyl n-amyl ketone, cyclohexanone, di-iso-butyl ketone, etc.

Ethers can also be employed as a reaction solvent, e.g., di-iso-propyl ether, di-n-butyl ether, ethylene glycol di-iso-butyl ether, methyl o-tolyl ether, ethylene glycol dibutyl ether, di-iso-amyl ether, methyl p-tolyl ether, methyl m-tolyl ether, dichloroethyl ether, ethylene glycol di-iso-amyl ether, diethylene glycol diethyl ether, ethyl benzyl ether, diethylene glycol di-ethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as a solvent, e.g., ethyl formate, methyl acetate, ethyl acetate, n-propyl formate, iso-propyl acetate, ethyl propionate, n-propyl acetate, sec-butyl acetate, iso-butyl acetate, ethyl n-butyrate, n-butyl acetate, iso-amyl acetate, n-amyl acetate, ethyl formate, ethylene glycol diacetate, glycol diformate, cyclohexyl acetate, furfuryl acetate, iso-amyl n-butyrate, diethyl oxalate, isoamyl iso-valerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium sub-group or the platinum sub-group, i.e., palladium, rhodium, or ruthenium, or platinum, osmium, rhenium, or iridium.

While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as platinum chloride, rhodium acetate, ruthenium bromide, osmium propionate, iridium benzoate, palladium isobutyrate, etc. Examples of suitable chelates are palladium acetylacetonate, and complexes of the palladium group metal ions with such conventional chelating agents as ethylene diamine tetraacetic acid, citric acid, etc.

To facilitate the rate of oxidation by rendering it more facile to oxidize the reduced form of the platinum metal, we prefer to employ a reaction medium that contains a halogen, i.e., a bromine- or chlorine- (preferably a chlorine) containing compound. The halogen can be added as elemental chlorine or bromine; however, it is preferred to employ less volatile halogen compounds such as hydrogen, alkali metal or ammonium halides, e.g., hydrogen chloride; hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent redox salts are employed, these too can be added as a chloride or bromide. Various organic compounds which liberate chlorine, bromine, hydrogen chloride or bromide under the reaction conditions can also be used, such as aliphatic chlorides or bromides, e.g., ethylene bromide, propylene chloride, butyl chloride, benzyl bromide, phosgene, etc.

In general, sufficient of any of the aforementioned halogen-containing compounds can be added to provide between about 0.05 and about 5.0 weight percent free or coordinately bonded or covalently bonded halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive than the platinum metal in the solution can be used. Typical of such are the soluble salts of the multivalent metal ions such as the carboxylates, e.g., propionates, benzoates, acetates, etc.; nitrates; sulfates; halides, e.g., bromides, chlorides, etc.; of copper, iron, manganese, cobalt, mercury, nickel, cerium, uranium, bismuth, tantalum, chromium, molybdenum, or vanadium. Of these, cupric and ferric salts are preferred and cupric salts are most preferred. In general, the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc. can be added to the reaction medium.

The process may be operated in a continuous manner by using a platinum group metal and redox agent which participate in a catalytic manner. An olefin, carbon monoxide and oxygen are introduced into contact with a liquid reaction medium containing an inorganic acid anhydride of the aforementioned type. The carbonylation of the olefin and oxidation to the carboxylic acid results in the stoichiometric reduction of the platinum group metal. The introduction of oxygen serves to reoxidize the reduced metal to its more oxidized and active form. Continuous or intermittent introduction of oxygen can be employed; however, continuous introduction is preferred. Preferably, the rate of oxygen introduction is controlled relative to the olefin and carbon monoxide rates so as to maintain the oxygen content of the exit gases below the explosive concentration, i.e., less than about 10 and preferably less than about 3 volume percent. Under these conditions, the exit gas comprising chiefly the olefin and carbon monoxide can be recycled to the liquid reaction medium. When the olefin is a liquid under the reaction conditions, an inert gas such as nitrogen, air or mixtures of nitrogen and air can be employed to dilute the gas phase and exit gas stream from the reactor and thereby avoid explosive gas compositions.

Carbon monoxide is introduced into contact with the reactants at a sufficient rate to insure the desired carboxylation. Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

The reaction can be employed under relatively mild conditions, e.g., temperatures from about 30° to about 300° C.; preferably from about 90° to about 200° C. are employed. The reaction pressure employed is sufficient to maintain a liquid phase and preferably, when gaseous olefins are employed, super atmospheric pressures are employed to increase the solubility of the olefin in the reaction medium and thereby accelerate the reaction rate. Accordingly, pressures from about atmospheric to about 200 atmospheres or more, preferably elevated pressures from about 10 to about 100 atmospheres are used.

During the oxidation, a portion of the liquid reaction medium can be continuously withdrawn and distilled to recover the desired products from the reaction medium and the catalyst salts therefrom can be recycled to the reaction zone for further contact. Water formed by spurious side reactions during the process unites with the inorganic acid anhydride in the reaction medium to form the inorganic acid of said anhydride. Such inorganic acids are substantially entirely insoluble in the organic reactants and/or products within the reaction medium and can be removed therefrom by conventional separation such as filtration. Inorganic acids removed from the reaction medium can be returned to their anhydride form by heating at temperatures sufficiently high to remove the water therefrom. The resulting anhydrides can then be recycled to the reaction medium. In this manner the process of our invention may be operated in a continuous fashion.

The following examples will illustrate the practice of our invention and serve to demonstrate the results obtainable thereby.

*Example I*

Into a half-gallon autoclave was placed 1 gram of palladium chloride, 5 grams of anhydrous cupric chloride, 5 grams of lithium chloride, 5 grams of lithium acetate dihydrate, and 25 grams of boric anhydride. The autoclave was pressured to 300 p.s.i.g. with ethylene and then to a total pressure of 900 p.s.i.g. with carbon monoxide. The resulting mixture was heated to 300° F., and while maintaining this temperature, and stirring, oxygen was slowly introduced into contact with the reactants at 10 to 20 p.s.i. increments to maintain a relatively constant pressure. After 30 minutes, the introduction of oxygen was ceased and the autoclave was cooled, depressured and opened. The reaction product comprised a solid portion and a liquid portion. The solid portion of the product consisting of catalyst residue along with boric acid and boric anhydride was removed from the liquid product by filtration. Fractional distillation of the liquid product produced 3.5 grams of acrylic acid, 26 grams of beta-acetoxypropionic acid, and 8 grams of propionic acid.

The experiment was repeated using propylene instead of ethylene and crotonic acid was obtained.

*Example II*

Into a half-gallon autoclave was placed 1 gram of palladium chloride, 5 grams of anhydrous cupric chloride, 5 grams of lithium chloride, 400 ml. ethyl acetate, 50 grams of acetic acid, and 50 grams of boric anhydride. The autoclave was pressurized with ethylene to 400 p.s.i.g. and to a total pressure of 900 p.s.i.g. with carbon monoxide. The resulting mixture was heated to a temperature of 150° C., and while maintaining this temperature, and stirring, oxygen was slowly introduced into contact with the reactants at 20 p.s.i. increments until 200 p.s.i. of oxygen had been added. The autoclave was then cooled, depressured and opened. There resulted a mixture of acrylic, propionic and beta-acetoxypropionic acids.

The preceding examples have been set forth to illustrate a mode of practice of the invention and to demonstrate the results thereby obtainable. It is not intended that these examples be unduly limiting of the invention which, rather, is intended to be defined by the method steps, reactants, solvents and reaction conditions and all apparent equivalents of the aforementioned set forth in the following claims.

We claim:

1. The oxidative carbonylation of hydrocarbon olefins having from 2 to about 25 carbons that comprises contacting said olefin, oxygen and carbon monoxide with an organic reaction solvent at a temperature of 30° to about 300° C. and a pressure sufficient to maintain the solvent in liquid phase, said solvent containing 0.01 to about 5.0 weight percent of a catalyst comprising a platinum group metal and 0.1 to about 50 weight percent inorganic acid anhydride that is nonreactive with the organic reactants and products and the catalyst and insoluble in the reaction medium at reaction conditions, to thereby obtain an alpha,beta-ethylenically unsaturated acid having a total of one more carbon than said olefin.

2. The oxidation of claim 1 wherein said platinum group metal is palladium.

3. The oxidation of claim 1 wherein said catalyst also contains between 0.5 and 5 weight percent of a redox agent selected from the class consisting of soluble salts of multivalent metals having an oxidation potential more positive in said solvent than said platinum metal, nitrogen oxides and mixtures thereof.

4. The oxidation of claim 1 wherein said inorganic acid anhydride is boric anhydride.

5. The oxidative carbonylation of claim 1 wherein said olefin is a hydrocarbon olefin having from 2 to about 6 carbons.

6. The oxidative carbonylation of claim 1 wherein said olefin is propylene and said unsaturated acid comprises crotonic acid.

7. The oxidative carbonylation of ethylene to acrylic acid which comprises introducing ethylene, oxygen and carbon monoxide into contact with an organic reaction solvent that contains from 0.01 to about 5.0 weight percent of a catalyst comprising a platinum group metal and 0.1 to about 50 weight percent of an inorganic acid anhydride that is nonreactive with the organic reactants and products and the catalyst, and insoluble in the reaction medium at a temperature between about 30° and about 300° C. and sufficient pressure to maintain said organic reaction solvent under liquid phase conditions at said temperature and thereby obtain said acrylic acid.

8. The oxidative carbonylation of claim 7 wherein said catalyst also contains between about 0.5 and 5 weight percent of a redox agent selected from the class consisting of soluble salts of multivalent metal ions having an oxidation potential more positive than said platinum group metal, nitrogen oxides and mixtures thereof.

9. The oxidation of claim 7 wherein the inorganic acid anhydride is boric anhydride.

10. The oxidative carbonylation of ethylene to acrylic and beta-acyloxypropionic acid that comprises contacting ethylene, oxygen and carbon monoxide with an aliphatic acid solvent containing a catalyst comprising between about 0.01 and about 5.0 weight percent of palladium chloride and between about 0.5 and about 5.0 weight percent of cupric chloride and an inorganic acid anhydride that is nonreactive with the organic reactants and products and the catalyst, and insoluble in the reaction medium at a temperature between about 30° and 300° C. and sufficient pressure to maintain said aliphatic acid in liquid phase.

11. The oxidation of claim 10 wherein said inorganic acid anhydride is boric anhydride.

12. The oxidation of claim 10 wherein said aliphatic acid is acetic acid.

References Cited

UNITED STATES PATENTS 3,065,242  11/1962  Alderson _____ 260—544

OTHER REFERENCES

Tsuji, Tetrahedron Letters, No. 16 (1963), pp. 1061–64.

LORRAINE A. WEINBERGER, *Primary Examiner.*

S. B. WILLIAMS, *Assistant Examiner.*